United States Patent
Linder

(10) Patent No.: US 10,312,839 B2
(45) Date of Patent: Jun. 4, 2019

(54) BRUSHLESS DC MOTOR WITH CONTROL ELECTRONICS MOTOR ASSEMBLY

(71) Applicant: Simplex Motion AB, Göteborg (SE)

(72) Inventor: Johan Linder, Göteborg (SE)

(73) Assignee: SIMPLEX MOTION AB, Gothenburg (SE)

( * ) Notice: Subject to any disclaimer, the term of this patent is extended or adjusted under 35 U.S.C. 154(b) by 0 days.

(21) Appl. No.: 15/700,454

(22) Filed: Sep. 11, 2017

(65) Prior Publication Data
US 2018/0097462 A1 Apr. 5, 2018

Related U.S. Application Data

(63) Continuation of application No. 14/118,135, filed as application No. PCT/SE2012/050539 on May 16, 2012, now abandoned.

(30) Foreign Application Priority Data

May 22, 2011 (SE) ........................................ 1130047

(51) Int. Cl.
*H02K 5/18* (2006.01)
*H02P 6/16* (2016.01)
(Continued)

(52) U.S. Cl.
CPC .................. *H02P 6/16* (2013.01); *H02K 5/18* (2013.01); *H02K 11/33* (2016.01); *H02K 11/35* (2016.01); *H02K 29/08* (2013.01); *H02K 5/225* (2013.01)

(58) Field of Classification Search
None
See application file for complete search history.

(56) References Cited

U.S. PATENT DOCUMENTS

| 6,522,130 | B1 | 2/2003 | Lutz |
| 2005/0029882 | A1* | 2/2005 | Liu .......................... H02K 5/22 310/91 |

(Continued)

FOREIGN PATENT DOCUMENTS

| JP | 2003287440 | 10/2003 |
| WO | 2007062766 A1 | 6/2007 |

OTHER PUBLICATIONS

Sara Thulin, International Search Report for application PCT/SE2012/050539, dated Jun. 21, 2012, Stockholm, Sweden.

*Primary Examiner* — Eduardo Colon Santana
*Assistant Examiner* — Said Bouziane
(74) *Attorney, Agent, or Firm* — Babcock IP, PLLC

(57) ABSTRACT

A motor assembly, comprising a brushless DC motor with control electronics which comprises at least two magnetic field sensors adapted to measure magnetic flux from magnetic poles on a rotor in the brushless DC motor. The magnetic field sensors are adapted to determine an angular position of the rotor, with the purpose of controlling the current to the brushless DC motor based on the determined angular position. The brushless DC motor is an external rotor motor comprising an internal stator, and an external rotor having a periphery and an inside, which exhibits a plurality of permanent magnets disposed at regular intervals along the inside to provide the magnetic poles. The magnetic field sensors are disposed at a distance from each other in the proximity of the periphery to measure the magnetic flux leaking radially through the external rotor from the permanent magnets on the inside.

20 Claims, 2 Drawing Sheets

(51) Int. Cl.
*H02K 11/33* (2016.01)
*H02K 11/35* (2016.01)
*H02K 29/08* (2006.01)
*H02K 5/22* (2006.01)

(56) References Cited

U.S. PATENT DOCUMENTS

| | | |
|---|---|---|
| 2005/0106046 A1 | 5/2005 | Winkler |
| 2007/0252541 A1 | 11/2007 | Hazelton et al. |
| 2009/0230824 A1* | 9/2009 | Hornberger ............ H02K 29/08 310/68 B |
| 2009/0302719 A1 | 12/2009 | Nakagawa et al. |
| 2010/0090633 A1* | 4/2010 | Deller .................... H02K 29/08 318/400.39 |
| 2011/0056716 A1* | 3/2011 | Jonsson ................. B23D 47/08 173/217 |
| 2013/0175012 A1* | 7/2013 | Yamada .................... F28F 1/00 165/121 |

* cited by examiner

BRUSHLESS DC MOTOR WITH CONTROL ELECTRONICS MOTOR ASSEMBLY

TECHNICAL FIELD

The present invention relates to a motor assembly comprising a brushless DC motor with control electronics.

BACKGROUND OF THE INVENTION

In many applications where electric motors are used, a smooth rotation of the rotor of the electric motor, and therefore also a precise control of the rotor current and the wave shape thereof, are required. To be able to achieve a sufficiently precise control, it is required that the angular position of the rotor can be detected in an accurate manner. Usually, in conventional electric motors, an angle sensor or resolver, together with associated electronics, are used for determining the angular position. The angle sensors detect mechanical movement and convert the detected movement into electric signals. Optical pulse sensors and absolute angle sensors are two commonly occurring types of angle sensors.

To be able to achieve a precise current control and smooth rotation in so-called brushless DC motors, i.e. alternating current motors with permanent magnets on the rotor and electronic commutation, accurate detectors are required for the detection of the angular position of the rotor and the electronic commutation. For example, US2010/0090633 A1 discloses a motor assembly comprising a brushless DC motor having a rotating shaft, an electronic controller attached to the motor and positioned outside the rotating shaft, and a two pole permanent magnet affixed to the shaft for rotation by the shaft in a plane orthogonal to the axis or rotation of the shaft. Furthermore, the motor assembly comprises a X-Y Hall Effect Sensor carried by the electronic controller and positioned proximate the magnet, wherein the Hall Effect Sensor produces Sine and Cosine components of the magnetic field as the magnet is rotated by the motor shaft. The electronic controller further includes means for determining the motor angle position from said Sine and Cosine components, and commutation logic. A controller on the board, positioned directly above one end of the rotating shaft of the motor assembly, contains the highly integrated functions: internal analog digital converters, pulse width modulation registers for driving the power amplifier, internal communication ports, and all of the RAM memory and non-volatile Flash memory that is required for motor control.

EP 1 099 092 B1 discloses a brushless electric motor and a method for controlling it. The electric motor comprises a rotor, a sense element with a plurality of magnetic poles, and first and second Hall effect sensors mounted with their sensing planes perpendicular to a surface of the sense element to measure magnetic flux from the magnetic poles in a direction tangential to the sense element, wherein one of the sense element and the first and second Hall effect sensors is mounted in a fixed relationship with the rotor. The Hall effect sensors are adapted for outputting a measurement signal so that at least one output signal from at least one of the first and second sensors is linear at each rotational position of the rotor, wherein the measurement signals are used for determining an absolute rotational position of the rotor within an electrical cycle, wherein the motor is adapted to be controlled based on the decoded rotor position.

U.S. Pat. No. 7,579,799 B2 discloses a system for measuring the angular position of a rotor, a method for measuring the angular position, and a method for controlling an electric motor. The system has a rotor assembly comprising a plurality of annularly disposed magnetic domains of the magnetic poles of the motor, and a sensor module having at least two Hall Effect Devices disposed at a specified relative angular separation with respect to each other. The sensor module is suitably configured to produce a plurality of input signals in response to a magnetic flux variation corresponding to axial rotation of the magnetic domains of the magnetic field poles of the motor. A position measurement module is suitably configured to process said input signals to produce converted sinusoidal reference signals. The sinusoidal reference signals have at least one of an offset scale factor and an amplitude scale factor. An error term is determined by processing said input signals to produce a position estimate signal corresponding to an approximate measurement of the angular position of the rotor. Subsequently, a refined measurement of the angular position of the rotor is produced by processing the error term.

Furthermore, U.S. Pat. No. 6,906,494 B2 discloses a motor controller for driving a motor having a rotor, which includes magnets. The motor controller comprises a magnetic flux detector for detecting a magnetic flux from the magnets and obtaining a magnetic pole signal, a position signal converter for finding a position of the rotor based on the magnetic pole signal, a differentiator for finding a speed signal based on the output of the position signal converter, a speed controller for comparing the speed signal with a predetermined instructive speed, and for outputting an instruction signal, and a pulse width modulation controller for performing pulse width modulated drive of the motor according to the instruction signal. The pulse width modulation controller drives the motor in a sine wave form, wherein the magnetic pole signal is a 2 phase sine wave signal having a phase difference of 90°.

A disadvantage of many of the previously known motor assemblies with brushless DC motors and integrated control electronics is that the motor assemblies are often larger and bulkier than desirable for many applications. One reason for this is that a conventional brushless DC motor generally produces a rather low torque, which means that a larger motor size will have to be chosen, or that the motor will have to be equipped with a gearbox, to obtain a motor with a sufficiently large output torque. Another reason is that many of the previously known motor assemblies have a design which requires a complicated and space-consuming measurement arrangement, usually disposed at the shaft end of the motor, to be able to measure the angular position of the rotor and/or bulky control electronics, which considerably increases the length or other external dimensions of the motor assembly.

SUMMARY OF THE INVENTION

Accordingly, a first object of the invention is to provide a very compact motor assembly with a brushless DC motor and control electronics, which provides substantially better performance, as regards output torque, power/volume ratio and efficiency, for a considerably lower price than what has been possible with the previously known motor assemblies.

This first object is achieved by means of a motor assembly according to claim 1, comprising a brushless DC motor with control electronics, which comprises at least two magnetic field sensors adapted to measure magnetic flux from magnetic poles on a rotor in the brushless DC motor, and wherein the magnetic field sensors are adapted to determine an angular position of the rotor, based on the measurement of magnetic flux, with the purpose of controlling the current to the brushless DC motor based on the determined angular position, and wherein the brushless DC motor is an external rotor motor, comprising an internal stator and an external rotor, wherein the external rotor has a periphery and an inside, exhibiting a plurality of permanent magnets, which are disposed at regular intervals along said inside to provide said magnetic poles, and wherein the at least two magnetic field sensors are disposed at a distance from each other in the proximity of the periphery to measure the magnetic flux leaking radially through the external rotor from the permanent magnets on the inside.

Thanks to the fact that the motor assembly according to the invention uses an integrated control electronics with magnetic field sensors to determine the angular position of the rotor in a brushless DC motor which, according to the invention, has been selected to be an external rotor motor, a very inexpensive and compact motor assembly with good motor performance can be realized. Thanks to the external rotor motor, the motor assembly according to the invention can be provided with a sufficiently high torque to eliminate the need for a gearbox, which results in a simpler and cheaper design and smaller external dimensions. Furthermore, thanks to the external rotor motor, the motor assembly according to the invention obtains a very high efficiency, enabling a higher output power and lower energy consumption. Thanks to the arrangement of magnetic field sensors in combination with an external rotor motor, the angular position of the rotor can be determined by measuring radial magnetic leakage flux through the external rotor, i.e. external relative to the stator, thus enabling the whole measurement arrangement to be simplified and the control electronics to be designed in a more compact fashion, so that the motor assembly according to the invention can be given very small external dimensions in relation to its motor performance.

BRIEF DESCRIPTION OF THE DRAWINGS

In the following, a number of embodiments of the invention will be described more closely, only as examples and with reference to the accompanying schematic drawings, in which.

DESCRIPTION OF EMBODIMENTS OF THE INVENTION

Figure 1:
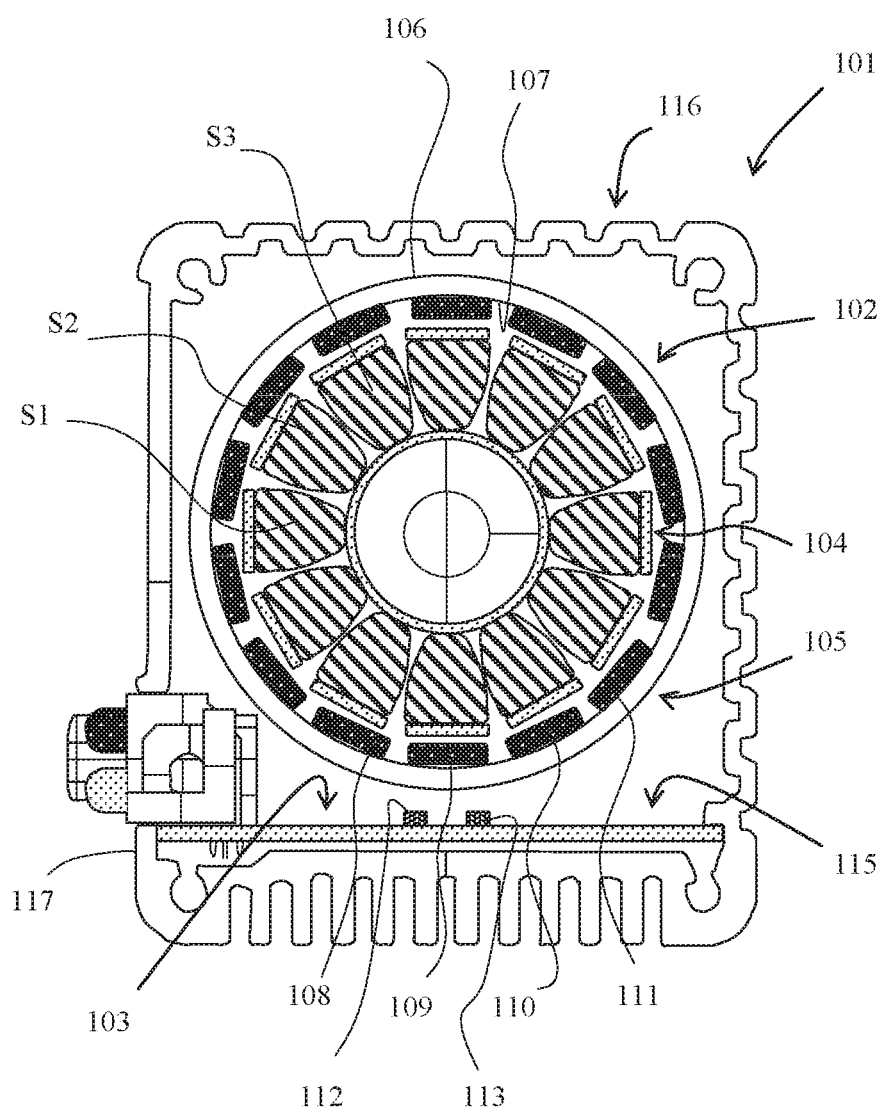
FIG. 1 is a cross-sectional view of a motor assembly according to the invention, illustrating the structure and principle of operation of the motor assembly.
Figure 2:
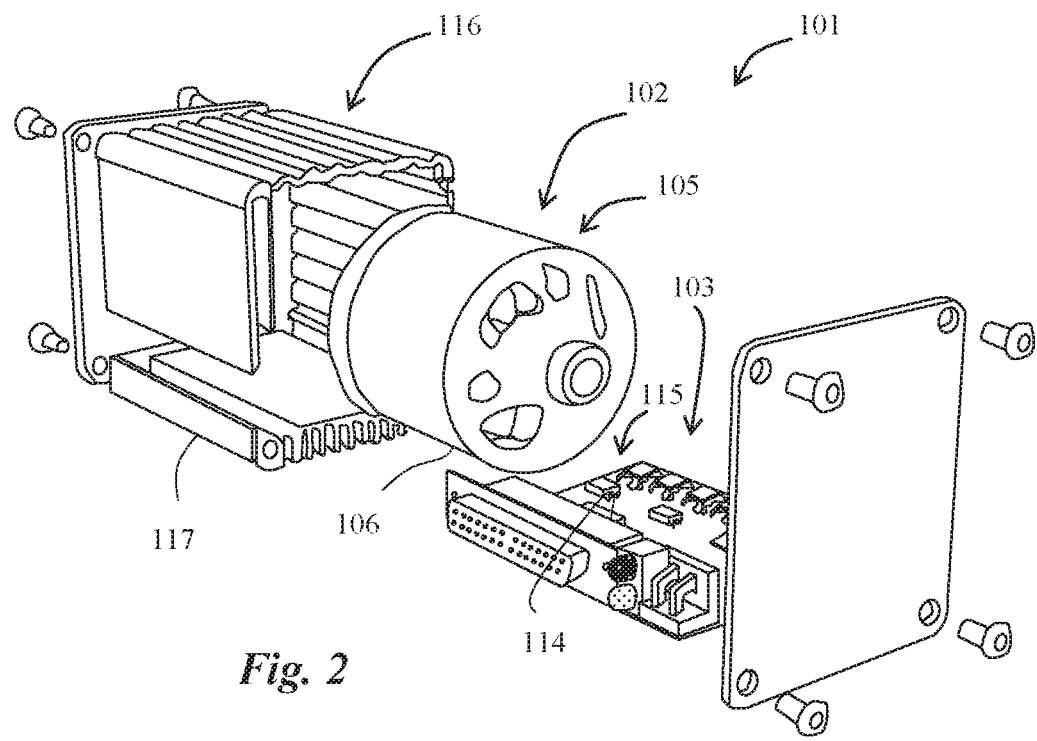
FIG. 2 is a perspective view of a motor assembly according to a preferred embodiment of the invention, in a partially exploded condition.
Figure 3:
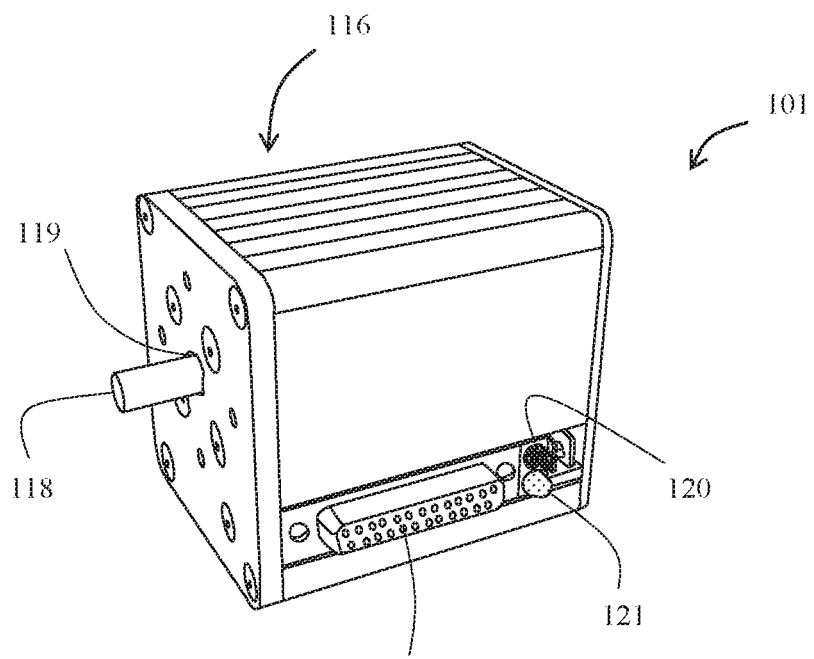
FIG. 3 is another perspective view of the motor assembly of FIG. 2, in an assembled condition.

In the following, a number of embodiments of the invention will be described in detail with reference to the accompanying drawings. In the drawings, FIG. 1 shows a schematic representation of a cross-section of a motor assembly according to the invention. FIG. 2 is a perspective view of a motor assembly according to a preferred embodiment of the invention, in a partially exploded condition, whereas FIG. 3 shows the same motor assembly in an assembled condition.

The motor assembly 101 comprises a brushless DC motor 102 with control electronics 103. A brushless DC motor can also be defined as an alternating current motor with permanent magnets on the rotor and electronic commutation.

The control electronics 103 of the motor assembly comprises at least two magnetic field sensors adapted to measure magnetic flux from magnetic poles on a rotor in the brushless DC motor 102. The magnetic field sensors are adapted to determine an angular position of the rotor, based on the measurement of magnetic flux, with the purpose of controlling the current to the brushless DC motor based on the determined angular position, The brushless DC motor in the motor assembly according to the invention is an external rotor motor 102. Brushless DC motors of this type have become common as motors in model aircraft in the last few years, and are commercially available. The external rotor motor 102 comprises an internal stator 104 and an external rotor 105. The diagonally hatched areas S1, S2, S3 in FIG. 1 schematically illustrate the copper winding of the stator. The external rotor 105 has a periphery 106 and an inside 107, exhibiting a plurality of permanent magnets 108, 109, 110, 111, shown as black areas with white dots in FIG. 1.

In a preferred embodiment of the motor assembly according to the invention, the previously mentioned magnetic field sensors comprise at least two stationary Hall sensors 112, 113 which can, particularly advantageously, be linear Hall sensors. As has become evident from the previous description of the prior art, Hall sensors are well known, per se, for use in control systems for brushless DC motors, and will therefore not be described more closely here. However, embodiments of the invention where the magnetic field sensors are of another type are also conceivable, such as magnetoresistive sensors, magnetostrictive sensors or flux gate sensors. In the motor assembly according to the invention, it is advantageous that the sensors have small dimensions and few or no moving parts, which is the reason why Hall Effect sensors or magnetoresistive sensors are preferred.

In the motor assembly according to the invention, the permanent magnets 108, 109, 110, 111 are disposed at regular intervals along the inside 107 of the external rotor to provide the previously mentioned magnetic poles, wherein the previously mentioned at least two magnetic field sensors 112, 113 are disposed at a distance from each other in the proximity of the periphery 106 to measure the magnetic flux leaking radially through the external rotor 105 from the permanent magnets 108, 109, 110, 111 on the inside 107 of the rotor.

Thanks to the combination of a measurement arrangement with magnetic field sensors and permanent magnets belonging to the rotor of the external rotor motor, which is used in the motor assembly according to the invention, the previously mentioned angular position can be determined by measuring radial magnetic leakage flux through the external rotor, i.e. external relative to the stator, thus enabling the whole measurement arrangement to be simplified and the control electronics to be designed in a more compact fashion. Furthermore, particularly with Hall sensors, the measurement arrangement will provide a good measurement accuracy of about ±1° and a good resolution of about 0.1°.

An even number of permanent magnets 108, 109, 110, 111 are disposed on the inside 107 of the external rotor 105 of the external rotor motor. Every other permanent magnet has the north pole facing inward, and every other has the south pole facing inward. Consequently, the smallest possible number of magnetic poles in the external rotor motor is two poles, which constitute an electrical cycle. An increased number of magnetic poles in an external rotor motor will therefore result in more electrical cycles in this external rotor motor. Geometrically speaking, as expressed in degrees, the electrical cycle is equal to 2 times 360° divided by the number of magnetic poles.

In a preferred embodiment of the motor assembly according to the invention, the external rotor motor 102 has more than 6 magnetic poles on the external rotor 105. By means of such an arrangement, the electrical cycle will be smaller than 30 degrees, geometrically speaking, which makes it possible to position two stationary magnetic field sensors 112, 113 at least 90 degrees apart in the electrical cycle, without the magnetic field sensors ending up too far away from the rotor.

In a particularly preferred embodiment of the motor assembly according to the invention, the distance between two 112, 113 of the magnetic field sensors corresponds to about 90 degrees displacement in the electrical cycle of the brushless DC motor 102, preferably exactly 90 degrees displacement in the electrical cycle. By arranging the magnetic field sensors in this way, the respective sinusoidal signals from the sensors will also be displaced by 90 degrees, which means that when the derivative of one signal is 0, the derivative of the other signal is at a maximum. Since the accuracy in the angular position of the rotor is determined by the derivative of the signal, this embodiment provides the highest possible resolution in the measurement, and thereby enables a very precise control of the operation of the motor assembly.

The magnetic field sensors 112, 113 are preferably adapted to produce sine and cosine signals based on the measurement of the magnetic leakage flux, wherein the control electronics 103 comprises at least one microprocessor 114 (see FIG. 2) adapted to read and convert the measurement signals and calculate the rotor angle of the external rotor 105 in the electrical cycle of the brushless DC motor 102 based on the measurement signals. The microprocessor 114 is particularly advantageously adapted to calculate the rotor angle by using inverse trigonometry and a calibrating curve.

In another advantageous embodiment, the magnetic field sensors 112, 113 are adapted to produce measurement signals from the measurement of the magnetic leakage flux, wherein the control electronics 103 comprises at least one microprocessor 114 adapted to read said measurement signals and estimate the angular position of the external rotor 105 in the electrical cycle of the brushless DC motor 102 based on the measurement signals. Advantageously, the microprocessor 114 is adapted to estimate the angular position by using inverse trigonometry, preferably implemented by table look-up and interpolation. The microprocessor 114 is particularly advantageously adapted to improve the accuracy of the estimation even further by applying a calibrating curve to the estimated angular position.

The function of the integrated control electronics in the motor assembly according to the invention can be divided into three main parts: 1) magnetic field sensors with associated signal processing; 2) signal conversion from sensor signals to angle, and further to which current to be supplied to which poles in the stator; and 3) power electronics supplying the current to the poles. Furthermore, the control electronics provides a feedback function, so that a restoring torque will always be applied to the rotor in case of a deviation from a set point for the angular position of the rotor.

In a particularly advantageous embodiment of the motor assembly according to the invention, the control electronics comprises at least one planar circuit board 115 oriented tangentially to the periphery 106 of the external rotor 105, wherein the at least two magnetic field sensors 112, 113 are mounted on this circuit board 115. Such an arrangement provides a simplified installation, and a motor assembly having a very small length in the axial direction.

In a particularly preferred embodiment of the motor assembly according to the invention, the at least two magnetic field sensors 112, 113, the at least one microprocessor 114 with necessary software, the at least one circuit board 115, and other components included in the control electronics 103 together form a control system, wherein the control system and the brushless DC motor are integrated into a common housing 116. Such an arrangement enables a very compact, integrated control system in the motor assembly according to the invention.

In one advantageous embodiment, the housing 116 of the motor assembly according to the invention comprises at least one aluminium profile 117 against which the circuit board 115 is mounted, wherein the aluminium profile 117 is designed to be capable of serving as both a cooling flange and a casing of the motor. The provision of one or several such, preferably extruded, aluminium profiles in the motor assembly according to the invention ensures good thermal dissipation from the circuit board and that the electronic components mounted on the circuit board are not overheated.

In a particularly advantageous embodiment of the motor assembly according to the invention, the at least two magnetic field sensors 112, 113, the at least one microprocessor 114, and the other components included in the control system are disposed on one and the same circuit board 115. Such an arrangement simplifies the installation and makes the production cheaper, and enables the motor assembly according to invention to have the smallest possible external dimensions.

In one advantageous embodiment of the motor assembly according to the invention, the control system integrated into the motor assembly 101 constitutes a feedback control system adapted to control position, speed or acceleration of the external rotor 105.

The brushless DC motor 102 of the motor assembly according to the invention is preferably provided with an output shaft 118, wherein the housing 116 exhibits a hole 119 adapted for passage of the output shaft.

Advantageously, the outside of the motor assembly can exhibit at least one visible signalling device 120, 121 for displaying a signal related to the angular position of the external rotor 105. In the motor assembly according to the invention illustrated in FIGS. 1-3, the outside exhibits a red 120 and a green 121 lamp, respectively, which are adapted to indicate the instantaneous angular position of the rotor in a suitable manner, which may be an advantage when tuning the control electronics.

To enable the motor assembly according to the invention to be used as a servo motor or the like, the integrated control system is preferably adapted to be capable of communicating with a main control system providing set points for angular position, speed or acceleration.

Accordingly, in one advantageous embodiment, the motor assembly 101 exhibits at least one communication port 122 for connection to an external unit. Such a port for data communication can be designed with any suitable standard interface, and be used for data communication between the motor assembly according to the invention and an external control, measurement or diagnostic system.

Table 1 below illustrates some parameters of a commercially available, conventional motor assembly with a brushless DC motor having an encoder and integrated position control, in comparison to the corresponding parameters of a prototype of a motor assembly according to the invention of the type illustrated in the accompanying figures.

TABLE 1

| Parameter: | Commercial motor assembly with conventional technology | Prototype of motor assembly according to the invention |
|---|---|---|
| Size | 120 × 33 × 53, 495 grams | 80 × 60 × 70, 600 grams |
| Efficiency | 70% | 85% |
| Power (max) | 60 (270) W | 100 (400) W |
| Torque (max) | 54 (218) mNm | 600 (1100) mNm |
| Speed | 12000 rpm | 4000 rpm |
| Price | 6000 SEK in shop | Production cost about 600-800 SEK |

As is evident from the table above, the prototype according to the invention has a slightly higher weight and larger volume in this embodiment, but provides a much higher torque (11 times higher), and a higher power output at higher efficiency, than the commercial motor assembly with conventional technology. To be able to approach the same high torque as the prototype according to the invention, the motor assembly with conventional technology would need to be provided with a gearbox, which would make it much larger and heavier, reduce the speed to a low level, and further impair the efficiency in comparison to the motor assembly according to the invention in Table 1.

Many different fields of application, where the advantages of the motor assembly according to the invention can be utilized, are conceivable. One such application is to use motor assemblies according to the invention to replace motors of stepping motor-type in automation applications, e.g. for rebuilding manual production machines, such as turning and milling machines. In such an application, the motor assembly according to the invention provides improved performance for the same or lower price, and is thus very competitive. The advantages achieved by replacing a stepping motor with a motor assembly according to the invention are, among other things, feedback positioning, higher speeds and higher power output, high torque at high speeds, no vibrations, that power is only consumed when necessary, smaller external dimensions and lower weight.

In the foregoing, a number of embodiments of the invention have been described with reference to the figures in the accompanying drawings. It should be understood that the described embodiments and the details in the figures should only be regarded as examples, and that many other embodiments of the invention are possible within the scope of the following claims.

The invention claimed is:

1. A motor assembly, comprising:
a brushless DC motor with an external rotor and an internal stator;
a plurality of permanent magnets disposed upon an inside of a cylindrical periphery of the external rotor, the permanent magnets providing magnetic poles;
a printed circuit board provided with control electronics comprising a microprocessor; the printed circuit board is planar and is oriented tangentially to the cylindrical periphery of the external rotor, mounted within a housing with the brushless DC motor;
at least two magnetic field sensors positioned to sense a magnetic flux of the magnetic poles through the cylindrical periphery of the external rotor, the magnetic field sensors mounted upon the printed circuit board.

2. The motor assembly according to claim 1, wherein the external rotor has more than 6 magnetic poles.

3. The motor assembly according to claim 1, wherein a distance between two of the magnetic field sensors corresponds to about 90 degrees displacement in an electrical cycle of the brushless DC motor.

4. The motor assembly according to claim 1, wherein the housing includes a profile against which the printed circuit board is mounted, spaced away from the external rotor.

5. The motor assembly according to claim 4, wherein the profile is an aluminium extrusion configured for thermal dissipation.

6. The motor assembly according to claim 1, wherein the at least two magnetic field sensors are adapted to produce measurement signals from the sensing of the magnetic flux;
the microprocessor adapted to read the measurement signals and estimate an angular position of the external rotor in an electrical cycle of the brushless DC motor based on the measurement signals;
the microprocessor adapted to estimate the angular position by using inverse trigonometry, implemented by table look-up and interpolation; and
the control electronics is a feedback control system adapted to determine an amount of current to be supplied to selected windings of the internal stator based on the estimated angular position to control position, speed and/or acceleration of the external rotor.

7. The motor assembly according to claim 6, wherein the microprocessor is adapted to improve the accuracy of the estimation by applying a calibrating curve to the estimated angular position.

8. The motor assembly according to claim 6, wherein the control electronics constitutes a feedback control system adapted to control position, speed or acceleration of the external rotor.

9. The motor assembly according to claim 1, wherein the motor assembly exhibits at least one communication port for connection to an external unit.

10. The motor assembly according to claim 1, wherein the magnetic field sensors are linear Hall sensors detecting radial magnetic flux from the magnetic poles, through the periphery of the external rotor.

11. The motor assembly according to claim 1, further including at least one visible signalling device adapted to indicate instantaneous angular position of the rotor.

12. The motor assembly according to claim 11, wherein the visible signalling device is visible from an exterior of the housing.

13. A process for manufacturing a motor assembly, comprising:
providing a brushless DC motor with an external rotor and an internal stator;
a plurality of permanent magnets disposed upon an inside of a cylindrical periphery of the external rotor, the permanent magnets providing magnetic poles;
providing a printed circuit board; the printed circuit board provided with control electronics comprising a microprocessor and at least two magnetic field sensors; the printed circuit board is planar;
mounting the brushless DC motor and the printed circuit board within a housing, the printed circuit board oriented tangentially to the cylindrical periphery of the external rotor, whereby the magnetic field sensors are positioned to sense a magnetic flux of the magnetic poles through the cylindrical periphery of the external rotor.

14. The process according to claim 13, wherein the external rotor is provided with more than 6 magnetic poles.

15. The process according to claim 13, wherein a distance between two of the magnetic field sensors corresponds to about 90 degrees displacement in an electrical cycle of the brushless DC motor.

16. The process according to claim 13, wherein the housing is provided with a profile against which the printed circuit board is mounted, spaced away from the external rotor.

17. The motor process according to claim 16, wherein the profile is an aluminium extrusion configured for thermal dissipation.

18. The process according to claim 13, wherein the at least two magnetic field sensors are adapted to produce measurement signals from the sensing of the magnetic flux;

the microprocessor adapted to read the measurement signals and estimate an angular position of the external rotor in an electrical cycle of the brushless DC motor based on the measurement signals;

the microprocessor adapted to estimate the angular position by using inverse trigonometry, implemented by table look-up and interpolation; and the control electronics is a feedback control system adapted to determine an amount of current to be supplied to selected windings of the internal stator based on the estimated angular position to control position, speed and/or acceleration of the external rotor.

19. The process according to claim 18, wherein the microprocessor is adapted to improve the accuracy of the estimation by applying a calibrating curve to the estimated angular position.

20. The process according to claim 18, wherein the control electronics constitutes a feedback control system adapted to control position, speed or acceleration of the external rotor.

* * * * *